Dec. 29, 1953  F. A. JACKSON  2,664,146
RESILIENT SEAT MOUNTING
Original Filed Sept. 15, 1947

INVENTOR.
FORREST A. JACKSON
BY
Cook + Robinson
ATTORNEYS

Patented Dec. 29, 1953

2,664,146

UNITED STATES PATENT OFFICE 2,664,146

RESILIENT SEAT MOUNTING

Forrest A. Jackson, Portland, Oreg.

Substituted for application Serial No. 773,970, September 15, 1947. This application July 19, 1952, Serial No. 299,803

2 Claims. (Cl. 155—51)

This invention relates to improvements in seat mountings, and it has reference more particularly to the provision of a resilient mounting for seats as used on tractors, on farm implements of various kinds, and on road vehicles which are required to travel on or which operate over rough and irregular surfaces; it being the principal object of my invention to provide a resilient mounting for the driver's seat of a vehicle of the above stated character whereby the jar or jolt to which the driver is subjected when riding on the seat is reduced to a minimum and whereby the discomfort to the driver resulting from the rocking or side sway that is due to travel of the vehicle over rough surfaces is practically eliminated.

It is also an object of my invention to provide a resilient seat mounting of simplified character, that is relatively inexpensive, that is substantial, and which may be readily applied to practically any and all of the present day types of tractors, farm implements and road vehicles which are equipped with a driver's seat, and which device may be interposed between the seat mounting member as normally provided and the seat without any difficulty or rearrangement of parts of the tractor or vehicle.

Other objects of the invention reside in the details of construction of parts embodied in the device, in their combination and assembled relationship, as will hereinafter be fully described.

In accomplishing the above and other objects of the invention, I have provided the improved details of construction, the preferred forms of which are illustrated in the accompanying drawings, wherein—

Figure 1:
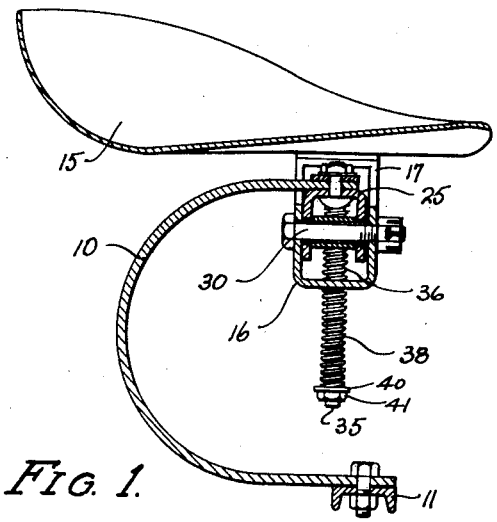
Fig. 1 is a vertical section taken substantially on line 1—1 in Fig. 2.

Referring more in detail to the drawings—

10 designates a semi-circularly curved mounting arm of a character or type usually provided on tractors and farm implements for the support of the driver's seat, and 11 designates a supporting member to which the arm 10 is rigidly secured at its lower end. The upper end portion of the bar 10 extends substantially horizontally and is equipped at that end for the mounting of the driver's seat, which is herein designated by reference numeral 15.

It is usually the case that the seat 15 is affixed directly to and upon the upper end of the arm 10. In the present instance, it is contemplated that where a seat is secured directly to the arm 10, it may be detached for the interposing of the present resilient mounting between the arm 10 and the seat and the fixed securement of the mounting to both of these parts.

Figure 5:
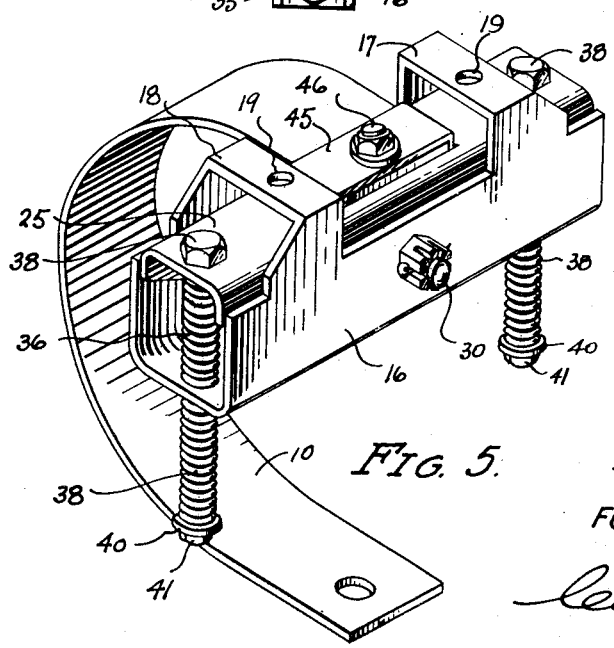
Fig. 5 is a perspective view of the seat mounting as applied to a support.

The present seat mounting comprises a horizontally disposed, lower cross member 16 of channel iron form, and disposed with the channel facing or opening upwardly; this member being equipped, across opposite end portions thereof, with arch-like or bridge members 17 and 18 which are provided, as seen in Fig. 5, with openings 19 for the reception of bolts or rivets whereby a seat 15 may be fixed securely upon this cross-member. The manner of mounting a seat on this base member is illustrated best in Fig. 2, wherein it is shown that the seat is disposed upon the arch members 17 and 18, and is secured thereto by bolts or rivets 20; there being resilient, cushioning blocks of rubber 22, or other suitable material, interposed between the seat and the arch-like members and secured in place by passing the bolts therethrough.

Figure 4:
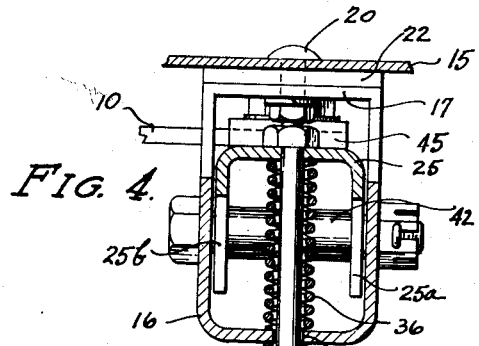
Fig. 4 is an enlarged cross-sectional view taken on line 4—4 in Fig. 2.

Mounted lengthwise of and within the lower cross-member 16, is a co-extensive, downwardly facing channel member 25. This has opposite side wall portions 25a and 25b, as shown in Fig. 4, overlapping within the corresponding side wall portions of the lower cross-member 16, and a pivot bolt 30 is extended through these overlapped wall portions to pivotally mount the upper cross-member 25 within the lower member 16 for relative rocking action on the bolt. The bolt 30 extends through these parts at a point midway between their opposite ends and the pivotal mounting permits the member 25 to have limited rocking action upon the supporting bolt 30.

Fixed in the opposite end portions of the member 25 and extending downwardly therefrom and through holes 28 provided in the bottom wall member of the cross-member 16, are bolts 35—35. Coiled springs 36 are applied about these bolts between the parts 25 and 16, and other coiled springs 38 are applied about the lower end portions of the bolts to bear against the bottom wall of the cross-member 16 and also against washers 40 held by nuts 41 that are applied to the lower ends of the bolts. The relationship of the bolts and springs is best illustrated in Fig. 4, by reference to which it will be understood that, with the springs at opposite ends of the device under substantially equal compression, the member 25 will be resiliently retained parallel to the member 16.

Figure 6:
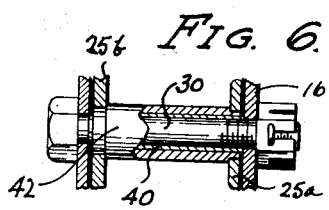
Fig. 6 is a detail view of the pivotal connection between the seat mounting members.

It is preferred that the pivot bolt shall be fitted with a sleeve 40 that extends between the opposite side walls of the member 16 as seen in Fig. 6, and which in turn is fitted in a sleeve 42 that is shouldered at its opposite ends to seat in openings in the side wall portions of the member 25.

It is preferred also that the connection of the upper end of arm 10 be by extending that end into a pocket provided beneath a strap 45 fixed to the top wall of part 25 and secured by a bolt 46 extended through these parts as seen best in Fig. 1.

Figure 2:
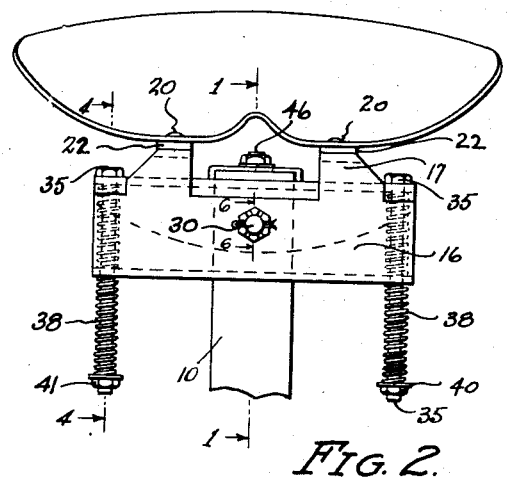
Fig. 2 is a front view of a seat mounting embodied by the present invention, showing a seat as applied thereto.
Figure 3:
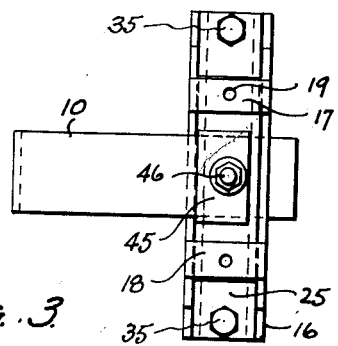
Fig. 3 is a top view of the seat mounting.

Assuming that the arm 10 is rigidly fixed at its lower end upon a tractor frame, or in the frame structure of a road vehicle, and at its upper end is rigidly secured centrally to the cross member 25, and that the seat 15 is secured as shown in Fig. 2 on the bridge portions 17 and 18 of the cross member 16, it will then be understood that any lateral oscillation or rocking action of the vehicle that would tend to cause the rider on the seat to sway from side to side, will be substantially reduced and absorbed in the springs 36 and 38 and the rider will not be subject to the usual jolt and jar and back strain that is caused by travel of the vehicle over rough and uneven surfaces.

Devices of this character may be made in various sizes and springs may be adjusted with respect to tension to best suit the particular type of vehicle on which the device is to be used.

Having thus described my invention, what I claim as new therein, and desire to secure by Letters Patent, is:

1. A seat mounting of the character described comprising a lower cross member of channel form, facing upwardly, an upper cross member of channel form, facing downwardly and disposed within the side walls of the lower member, a pivot bolt passed transversely through the side walls of said cross members and pivotally joining them between their ends for relative rocking action on said bolt, a support rigidly fixed to the upper cross member, seat mounting means on the lower cross member arched over the upper member, a seat mounted on said mounting means, and resilient means interposed between corresponding ends of said upper and lower cross members.

2. A seat mounting of the character described comprising a lower cross member of channel form, facing upwardly, an upper cross member of channel form, facing downwardly and disposed within the side walls of the lower member, a pivot bolt passed transversely through the side walls of said cross members and pivotally joining them between their ends for relative rocking action on said bolt, a support rigidly fixed to the upper cross member, seat mounting means on the lower cross member arched over the upper member, a seat mounted on said mounting means, bolts fixed in the ends of the upper cross member and extended through and beyond the ends of the other member, and springs mounted on said bolts and retained under tension to bear against the ends of said members to yieldingly resist rocking action of one relative to the other.

FORREST A. JACKSON.

References Cited in the file of this patent
UNITED STATES PATENTS

| Number | Name | Date |
|---|---|---|
| 1,174,429 | McCrea | Mar. 7, 1916 |
| 1,437,828 | Kisor | Dec. 5, 1922 |
| 2,073,872 | Kliesrath | Mar. 16, 1937 |
| 2,184,988 | Collier | Dec. 26, 1939 |
| 2,284,352 | Zank | May 26, 1942 |
| 2,339,953 | Schlorman | Jan. 25, 1944 |